United States Patent Office 3,729,509
Patented Apr. 24, 1973

3,729,509
(MONO- AND DIACYLVINYL)ARYL ALKANOIC
(AND ALKENOIC) ACIDS
Everett M. Schultz, Ambler, Pa., assignor to Merck &
Co., Inc., Rahway, N.J.
No Drawing. Filed Apr. 20, 1970, Ser. No. 30,303
Int. Cl. C07c 65/20
U.S. Cl. 260—515 R          5 Claims

ABSTRACT OF THE DISCLOSURE

[(Mono- and diacylvinyl)aryl]alkanoic (and alkenoic) acids and the salts, esters and amide derivatives thereof, wherein the aryl ring may be substituted by one or two halogen, lower alkyl or hydrocarbylene substituents. The products are diuretic and saluretic agents which may be prepared by treating a formylaryl alkanoic (or alkenoic) acid with a suitable ketone or diketone in the presence of a base.

---

This invention relates to a new class of chemical compounds which can be described generally as [(mono- and diacylvinyl)aryl]alkanoic (and alkenoic) acids and to the nontoxic, pharmaceutically acceptable salts, esters and amide derivatives thereof. It is also an object of this invention to describe a novel method of preparation for the [(mono- and diacylvinyl)aryl]alkanoic (and alkenoic) acids and their corresponding salts, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body tissue, lower dangerous excesses of fluid levels to acceptable limits and, in general, alleviate conditions usually associated with edema.

The [(mono- and diacylvinyl)aryl]alkanoic (and alkenoic) acids (I, infra) of this invention are compounds having the following structural formula:

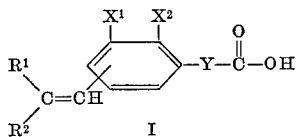

I wherein $R^1$ is hydrogen, alkyl, for example, lower alkyl such as methyl, ethyl, n-propyl and the like, alkanoyl, for example, lower alkanoyl such as acetyl, n-propionyl, n-butyryl, isobutyryl, n-hexanoyl, n-heptanoyl and the like; $R^2$ is alkanoyl, for example, lower alkanoyl such as acetyl n-propionyl, n-butyryl, isobutyryl, tertiary butyryl, n-valeryl, n-hexanoyl and the like, nitro substituted alkanoyl, for example, nitro substituted lower alkanoyl such as nitroacetyl and the like, hydroxy substituted alkanoyl, for example, hydroxy substituted lower alkanoyl such as 2-hydroxy-2-methylpropionyl and the like, cycloalkylcarbonyl, for example, cycloalkylcarbonyl containing from 3–6 nuclear carbon atoms such as cyclopropylcarbonyl, cyclobutylcarbonyl, cyclohexylcarbonyl and the like, alkenoyl, for example, lower alkenoyl such as 3-methyl-2-butenoyl, aralkanoyl, for example, mononuclear aralkanoyl such as phenylacetyl and the like or, taken together, $R^1$ and $R^2$ may be joined, with the carbon to which they are attached, to form a 2-oxocycloalkylidene radical containing from 5–7 nuclear carbon atoms such as 2-oxocyclopentylidene, 2-oxocycloheptylidene and the like; $X^1$ and $X^2$ are the same or different radicals selected from hydrogen, halo, for example, chloro, bromo, fluoro and the like or lower alkyl such as methyl and the like or, taken together, the $X^1$ and $X^2$ radicals may be joined to form a hydrocarbylene chain (i.e., a divalent organic radical composed solely of carbon and hydrogen) such as 1,3-butadienylene and the like; and Y is a lower alkylene such as methylene, ethylene and the like or lower alkylene such as vinylene, methyl substituted vinylene and the like and the non-toxic, pharmaceutically acceptable salts thereof as, for example, those derived from the alkali metals and alkaline earth metals as, for example, the alkali metal and alkaline earth metal carbonates, hydroxides and alkoxides such as sodium carbonate, sodium hydroxide, magnesium carbonate, calcium hydroxide, potassium hydroxide, sodium methoxide and the like or from organic bases as, for example, from amines such as monoalkylamines, dialkylamines, tertiary amines or heterocyclic amines such as methylamine, dimethylamine, diethylamine, triethylamine, piperidine, pyrrolidine, morpholine and the like.

A preferred embodiment of this invention relates to [4-(acylvinyl)phenyl]acetic acids (Ia, infra) having the following structural formula:

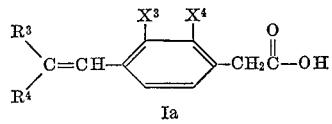

Ia wherein $R^3$ is hydrogen or lower alkanoyl; $R^4$ is lower alkanoyl; $X^3$ and $X^4$ are the same or different radicals selected from hydrogen or halo such as chloro and the like, with the proviso that one of the $X^3$ or $X^4$ radicals must be halo or, taken together, $X^3$ and $X^4$ may be joined to form a 1,3-butadienylene linkage; and the non-toxic, pharmaceutically acceptable salts thereof as, for example, the alkali metal and alkaline earth metal salts thereof such as the sodium salts or potassium salt. The foregoing class of compounds exhibits particularly good diuretic and saluretic activity and represents a preferred subgroup of compounds within the scope of this invention.

The [(mono- and diacylvinyl)aryl]alkanoic (and alkenoic) acids (I, supra) are conveniently prepared by treating a formylaryl alkanoic (or alkenoic) acid or corresponding ester derivative (II, infra) with a suitable ketone or diketone in the presence of a base. The bases which may be employed include amines, preferably secondary amines, for example, pyrrolidine, piperidine, piperidine acetate and the like in the presence of a suitable solvent such as benzene, toluene, xylene and the like. Also, an alkali metal and alkaline earth metal base may be employed such as sodium hydroxide, potassium hydroxide, sodium carbonate and the like in a suitable solvent such as water. The temperature at which the reaction is conducted is not a particularly critical aspect of this invention; however, when an organic solvent is employed, the reaction is conveniently conducted at the boiling point of the particular solvent employed and when water is employed, the reaction is conducted at ambient temperatures. The following equation illustrates this process:

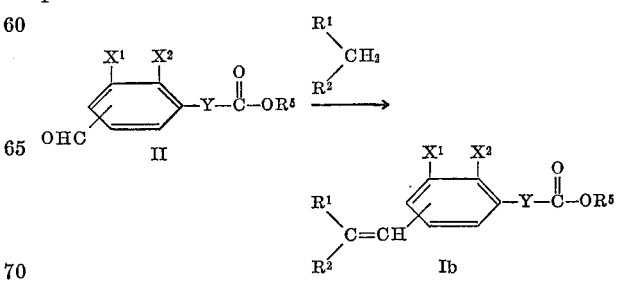

wherein $R^1$, $R^2$, $X^1$ and $X^2$ are as defined above and $R^5$ is hydrogen or lower alkyl such as methyl, ethyl and the like. When an ester starting material is employed, that is, when $R^5$ is Formula II, supra, is alkyl, the resulting ester product (Ib) may be hydrolyzed to the corresponding acid by conventional means as, for example, by treatment with an aqueous mixture of hydrochloric acid and acetic acid.

an appropriate reducing agent as, for example, with a metal catalyst on a suitable carrier such as 5–10% of a noble metal on carbon such as 5% rhodium on carbon and the like to yield the corresponding formylphenylalkonic acid (IIb, infra). The following equation illustrates this process:

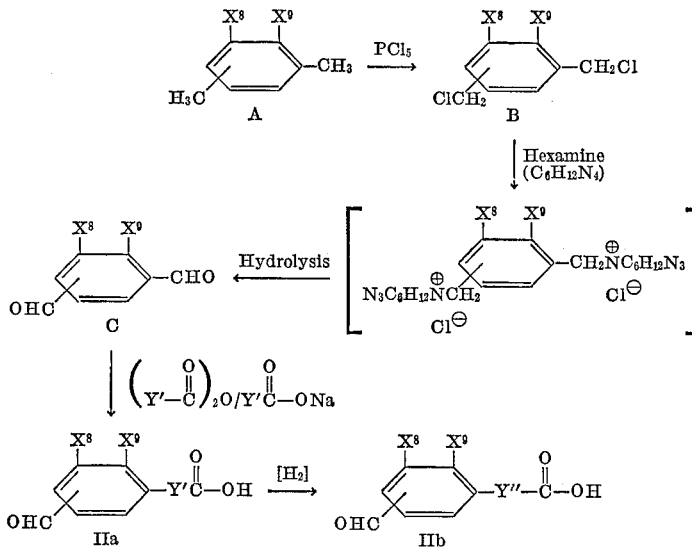

The formylaryl alkanoic (or alkenoic) acids and esters (II, supra) employed in the preparation of the [(acyl-vinyl)aryl]alkonic (or alkenoic) acids are either known compounds or may be conveniently prepared by treating a cyanoarylalkanoic acid or ester (IV, infra) with a reducing agent such as Raney nickel alloy in the presence of a suitable solvent such as formic acid followed by the treatment of the intermediate aldimine (III, infra) thus obtained with water. The following equation illustrates this process:

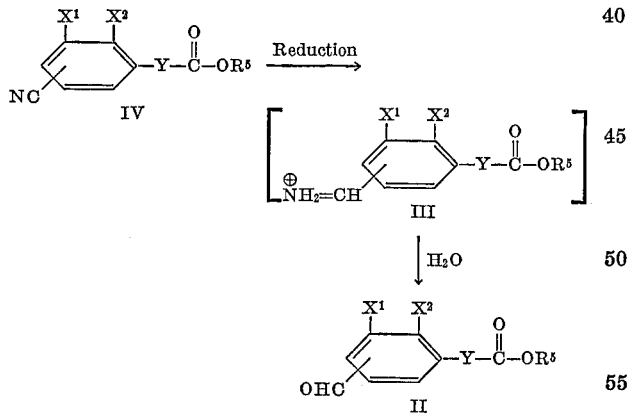

wherein $R^5$, $X^1$, $X^2$ and Y are as defined above.

The formylphenyl-alkanoic (and alkenoic) acids (IIa and IIb, infra) which are either nuclear unsubstituted or substituted with a radical other than an alkyl radical may be prepared by treating an appropriately substituted xylene (A, infra) with phosphorous pentachloride to form the corresponding α,α'-dichloroxylene (B, infra) followed by treatment with hexamine to afford the corresponding hexaminium salt which, upon treatment with an aqueous medium containing an acid such as acetic acid and the like, affords the corresponding benzenedicarboxaldehyde derivative (C, infra) and the aldehyde thus obtained is treated with a lower alkanoic acid anhydride such as acetic anhydride, propionic anhydride and the like in the presence of an alkali metal derivative of the corresponding lower alkanoic acid such as sodium acetate, sodium propionate and the like to afford the corresponding formylphenylalkenoic acid (IIa, infra) which may be employed as such as a reactant or may be reduced with wherein $X^8$ and $X^9$ are selected from hydrogen or halogen or $X^8$ and $X^9$ may be joined to form a hydrocarbylene chain; Y' is lower alkylene such as vinylene, methyl substituted vinylene and the like and Y'' is lower alkylene such as ethylene, methyl substituted ethylene and the like.

The cyanoaryl-alkanoic (or alkenoic) acids (IV, supra) employed in the preparation of the formylaryl-alkanoic (or alkenoic) acids and esters (II, supra) are conveniently prepared by either of two alternate methods. One method comprises treating a nuclear substituted aminoarylakanoic (or alkenoic) acid (VI, infra) with a solution of sodium nitrite and a strong acid such as hydrochloric acid, sulfuric acid, fluoboric acid and the like to form the corresponding diazonium salt (V, infra) followed by treating said diazonium salt with an aqueous solution of cuprous cyanide, potassium cyanide and sodium acetate. The following equation illustrates this process:

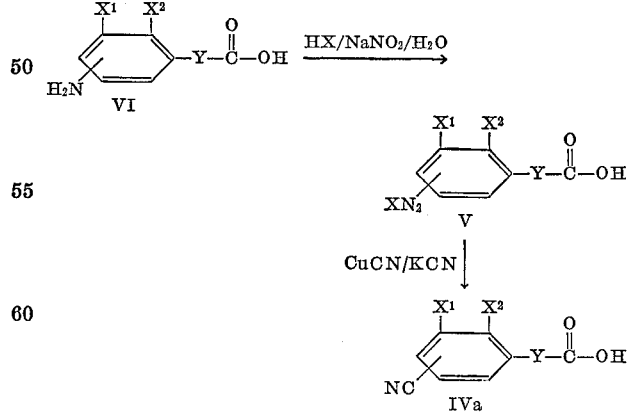

wherein $X^1$, $X^2$ and Y are as defined above and X is halo, sulfo, fluoboro and the like.

A second method for preparing the cyanoaryl-alkanoic (or alkenoic) acids and esters (IVb) and one which is limited to the cyanoaryl-alkanoic (or alkenoic) acids and esters wherein $X^1$ and $X^2$ in Formula IVb are hydrogen or lower alkyl or $X^1$ and $X^2$ may be joined to form a hydrocarbylene chain, comprises treating a nuclear halo substituted aryl-alkanoic (or alkenoic) acid or ester (VII, infra) with cuprous cyanide in the presence of a suitable aprotic solvent such as dimethylformamide and the like and an organic base such as pyridine and the like. The reaction is conveniently conducted at a temperature in the range of from about 100° to about 150° C.; however, in practice, the reaction is generally conducted at the reflux temperature of the solvent system employed. The following equation illustrates this process:

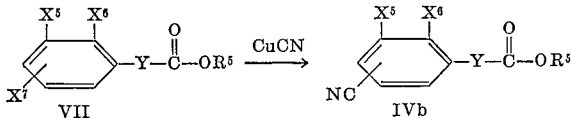

wherein $R^5$ and Y are as defined above; $X^5$ and $X^6$ are selected from hydrogen or lower alkyl or $X^5$ and $X^6$ may be joined to form a hydrocarbylene chain and $X^7$ is halo such as bromo and the like.

The nuclear amino substituted phenylacetic acids (VIa, infra) employed as starting materials in the preparation of the cyanoaryl alkanoic (and alkenoic) acid derivatives (IV, supra) are conveniently prepared by the hydrolysis of an (acetamidophenyl)thioacetomorpholide (VIII, infra) with an aqueous solution of an inorganic acid such as hydrochloric acid and the like. The following equation illustrates this process:

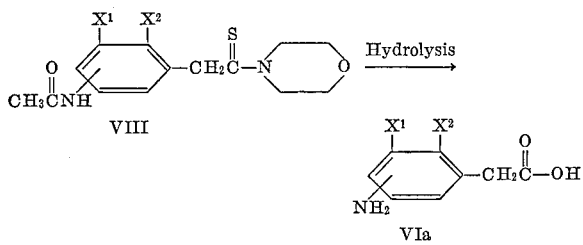

wherein $X^1$ and $X^2$ are as defined above.

The (acetamidophenyl)thioacetomorpholide (VIII, supra) employed in the preparation of the nuclear amino substituted phenylacetic acids (VIa, supra) is prepared by treating an acetamidoacetophenone (IX, infra) with sulfur and morpholine at temperatures in the range of from about 100° to 130° C. for a period of from 1 to 10 hours. The following equation illustrates this process:

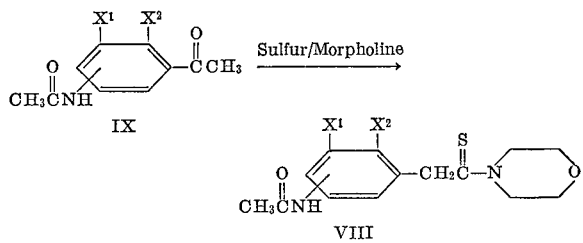

wherein $X^1$ and $X^2$ are as defined above.

Included within the scope of this invention are the non-toxic, pharmacological acceptable salts of the instant products. In general, any base which will form a salt with the foregoing [(mono- and diacylvinyl)aryl]alkanoic (and alkenoic) acids and whose pharmacological properties will not cause an adverse physiological effect when ingested by the body system is considered as being within the scope of this invention. Suitable bases thus include, for example, those derived from the alkali metals and alkaline earth metals as, for example, the alkali metal and alkaline earth metal carbonates, hydroxides and alkoxides such as sodium carbonate, sodium hydroxide, magnesium carbonate, calcium hydroxide, potassium hydroxide, sodium ethoxide and the like, ammonia, primary, secondary and tertiary amines such as mono-lower alkylamines such as methylamine, ethylamine and the like, di-lower alkylamines such as dimethylamine, diethylamine and the like, tri-lower alkylamines such as triethylamine and the like, alicyclic amines as cyclopentylamine and the like or heterocyclic amines, for example, piperidine, pyridine, pyrrolidine, morpholine and the like.

Also included within the scope of this invention are the ester and amide derivatives of the instant products which are prepared by conventional methods known to those skilled in the art. Thus, for example, if other ester derivatives besides those disclosed are desired, they may be prepared by the reaction of a [(mono- or diacylvinyl)aryl]-alkanoic (or alkenoic) acid of this invention with an alcohol as, for example, with a lower alkanol such as methanol, ethanol, n-propanol and the like. The amide derivatives of the [(mono- and diacylvinyl)aryl]alkanoic (and alkenoic) acids of this invention may be prepared by converting a [(mono- or diacylvinyl)aryl]alkanoic (or alkenoic) acid to its corresponding acid chloride by treating said acid with thionyl chloride followed by treating the acid chloride formed with ammonia or an appropriate mono-lower alkylamine or di-lower alkylamine to produce the corresponding amide compound or by treating the esters heretofore described with ammonia or an amine. These and other equivalent methods for the preparation of the ester and amide derivatives of the instant products will be apparent to one having ordinary skill in the art and to the extent that said derivatives are both non-toxic and physiologically acceptable to the body system, said derivatives are the functional equivalent of the corresponding [(mono- and diacylvinyl)aryl]alkanoic (and alkenoic) acids.

The examples which follow illustrate the [(mono- and diacylvinyl)aryl]alkanoic (and alkenoic) acids of this invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

[4-(2,2-diacetylvinyl)phenyl]acetic acid

A mixture of (4-formylphenyl)acetic acid (4.9 g., 0.03 mole), 2,4-pentanedione (4.5 g., 0.045 mole), toluene (100 ml.), acetic acid (10 ml.) and piperidene (1 ml.) is refluxed under a constant water separator until no more water is evolved (1 hour). The red-brown supernatant solution is decanted from a small amount of dark gum. The decantant is concentrated to dryness at reduced pressure to obtain a red-brown viscous oil. The oil is dissolved in a sodium bicarbonate solution, the solution is treated with decolorizing charcoal, filtered and is acidified with hydrochloric acid. The dark oil that separates is extracted with ether. The yellow ether extract is washed with a saturated sodium chloride solution and dried over sodium sulfate. After evaporation of the ether, the residual oil is triturated with cyclohexane whereupon it crystallized to yellow needles, M.P. 60°–80° C. After crystallization from benzene, there is obtained 2.1 g. of [4-(2,2-diacetylvinyl)phenyl]acetic acid, M.P. 92°–95° C.

Elemental analysis for $C_{14}H_{14}O_4$.—Calc. (percent): C, 68.28; H, 5.73. Found (percent): C, 68.68; H, 5.52.

EXAMPLE 2

[3-chloro-4-(2,2-diacetylvinyl)phenyl]acetic acid

Step A: (3 - chloro - 4 - acetamidophenyl)thioacetomorpholide.—An intimate mixture of 3-chloro - 4 - acetamidoacetophenone (3.0 g., 0..143 mole), precipitated sulfur (4.6 g., 0.143 mole) and morpholine (13.5 g., 0.158 mole) is heated gradually until a melt forms (at about 100° C.). The mixture then is heated up to 120°–130° C. and kept at this temperature for 7 hours. The hot mixture then is poured into water (250 ml.). On gentle warming, the resulting syrup solidifies to a dark yellow mass, which is pulverized in a mortar, collected on a filter and washed with water. After crystallization from 59% alcohol, there is obtained 31.3 g. (72% yield) of (3-chloro-4-acetamidophenyl) thioacetomorpholide, M.P. 125°–126.5° C.

Elemental analysis for $C_{14}H_{17}ClN_2O_2S$.—Calc. (percent): C, 53.75; H, 5.48; S, 10.25. Found (percent): C, 53.40; H, 5.35; S, 10.29.

Step B: (3-chloro-4-aminophenyl)acetic acid.—The (3-chloro-4-acetamidophenyl)thioacetomorpholide (93.8 g., 0.3 mole) is added to 6 N hydrochloric acid (500 ml.) and the mixture is refluxed for 1½ hours. The mixture then is cooled to 60° C. and filtered. The filtrate is evaporated to dryness under reduced pressure at about 80° C. and the residue is taken up in water (1 l.). The solution is brought to pH 6 by the addition of a 20% sodium hydroxide solution and then to pH 8 with a 10% sodium bicarbonate solution. The solution is stirred with decolorizing charcoal for one hour, warmed to 80° C. and filtered through a pad of diatomaceous earth. The warm solution is acidified with acetic acid and cooled to about 10° C. The pale yellow solid that separates is collected and is crystallized from water to obtain 43.6 g. (78% yield) of (3-chloro-4-aminophenyl)acetic acid, M.P. 136°–137° C.

Elemental analysis for $C_8H_8ClNO_2$.—Calc. (percent): C, 51.76; H, 4.34; N, 7.55. Found (percent): C, 52.14; H, 4.25; N, 7.74.

Step C.: (3 - chloro-4-cyanophenyl)acetic acid.—Concentrated hydrochloric acid (50 ml.) is added dropwise over a period of 15 minutes to a solution of sodium nitrite (21 g.) in water (100 ml.) at 0° C. with stirring. A solution of (3-chloro-4-aminophenyl)acetic acid (37.0 g., 0.2 mole) in a mixture of concentrated hydrochloric acid (20 ml.) and water (200 ml.) is cooled to 10° C. and is added slowly, with stirring, to the solution of nitrous acid prepared above maintaining the temperature of the reaction mixture at 0°–5° C. by external cooling. Concurrently, additional solid sodium nitrite (10 g.) (total 31 g., 0.45 mole) is added in small portions to the reaction mixture. The mixture then is stirred at 0°–5° C. for 20 minutes and the excess nitrous acid is destroyed by the addition of a solution of urea (15 g., 0.25 mole) in water (50 ml.). *Caution: The remainder of this preparation must be run in a good hood as hydrogen cyanide gas is evolved.* The cold dark red-black diazonium solution then is added portionwise to a well-stirred cold (10° C.) solution of cuprous cyanide (20 g., 0.22 mole), potassium cyanide (46 g., 0.70 mole) and sodium acetate trihydrate (400 g., 3.0 mole) in water (650 ml.). The black mixture is stirred at 25° C. for 1 hour, at 50° C. for 1 hour and then kept at 20°–25° C. for 16–20 hours. The mixture then is heated to 60° C. and filtered by gravity to remove some tarry material. The filtrate is acidified (caution—hydrogen cyanide gas) to Congo red with concentrated hydrochloric acid. A tan solid, which precipitates, is removed by suction filtration and discarded. The filtrate is cooled and extracted several times with ether. The combined ether extracts are washed with a saturated sodium chloride solution, dried over sodium sulfate, filtered and the ether evaporated under reduced pressure. The yellow brown residual oil solidifies slowly to a dark solid (30 g., M.P. 103°–112° C.). The crude product is dissolved in ether (800 ml.), treated with decolorizing charcoal and the solution evaporated to 150 ml. Ligroin (about 150 ml.) is added in small portions to incipient precipitation and the mixture is cooled to 0° C. for 16 hours. This type of recrystallization is repeated to obtain 15.2 g. (39% yield) of (3-chloro-4-cyanophenyl) acetic acid, M.P. 113°–115° C.

Elemental analysis for $C_9H_6ClNO_2$.—Calc. (percent): C, 55.26; H, 3.09; N, 7.16; Cl, 18.13. Found (percent): C, 55.36; H, 2.98; N, 7.21; Cl, 18.14.

Step D: (3-chloro - 4 - formylphenyl)acetic acid.—(3-chloro-4-cyanophenyl)acetic acid (15.6 g., 0.08 mole) is dissolved in 65 g. of formic acid (450 ml.) and Raney nickel alloy (20 g.) is added. The mixture is stirred and refluxed for 1½ hours. The reaction mixture is then cooled to 60° C. and additional Raney alloy (28 g.) is added slowly (foaming). The reaction mixture is again stirred and refluxed for 1½ hours. The reaction mixture is cooled, filtered through diatomaceous earth (suction) and the residue is washed on the filter with hot water (300 ml.). The aqueous filtrate is reserved and the residue in the filter funnel is then extracted with hot ethanol (400 ml.) for 10 minutes. The extract is filtered as above and the residue washed with 300 ml. of hot alcohol. The combined alcoholic extracts are filtered and concentrated to 50 ml. under reduced pressure. The concentrated alcoholic solution is then added to the original aqueous filtrate and the whole is concentrated at reduced pressure to 100–150 ml. (to remove most of the formic acid). The residue is diluted with water (1 l.) and the aqueous mixture is extracted with chloroform (4× 200 ml.). The chloroform extract is washed with a saturated sodium chloride solution and dried over sodium sulfate. The chloroform is removed by evaporation to afford a pale yellow residue which is recrystallized from benzene (charcoal) to yield 8.1 g. of (3-chloro - 4 - formylphenyl)acetic acid, M.P. 107°–109° C. This product is satisfactory for the next step. A sample may be further crystallized from ether-cyclohexane (7:5) to obtain substantially pure (3 - chloro-4-formylphenyl) acetic acid, M.P. 110°–112° C.

Elemental analysis for $C_9H_7ClO_3$.—Calc. (percent): C, 54.43; H, 3.55; Cl, 17.85. Found (percent): C, 54.51; H, 3.63; Cl, 17.75.

Step E: [3 - chloro-4-(2,2-diacetylvinyl)phenyl]acetic acid.—To a solution of (3-chloro-4-formylphenyl)acetic acid (11.98 g., 0.01 mole) in benzene (35 ml.) is added 2,4-pentanedione (1.0 g., 0.01 mole), acetic acid (3.5 ml.) and piperidine (5 drops). The mixture is refluxed under a constant water separator until no more water is evolved (about ½ hour) and the mixture then is concentrated to dryness at reduced pressure. The gummy residue is dissolved in sodium bicarbonate solution. The solution is treated with charcoal and acidified with concentrated hydrochloric acid. On standing for two days, a green partly gummy solid formed. This is crystallized from benzene-cyclohexane (5:3) (charcoal) to obtain 1.3 g. of [3-chloro-4-(2,2-diacetylvinyl)phenyl]acetic acid, M.P. 98°–100° C.

Elemental analysis for $C_{14}H_{13}ClO_4$.—Calc. (percent): C, 59.90; H, 4.67. Found (percent): C, 59.97; H, 4.74.

EXAMPLE 3

[3-chloro-4-(2-acetylvinyl)phenyl]acetic acid

5% aqueous sodium hydroxide (15 ml.) is added to an ice cold solution of (3-chloro-4-formylphenyl)acetic acid (1.98 g., 0.01 mole) in acetone (20 ml.). The mixture then is kept at 20°–25° C. for 30 minutes, diluted with water (50 ml.) and acidified with concentrated hydrochloric acid. The yellow solid that precipitates is collected, dried in air, and dissolved in hot benzene (300 ml.). The hot solution is filtered from an insoluble gum, concentrated to 50 ml. and, to the hot solution, cyclohexane (30 ml.) is added. The solid that separates on cooling is crystallized from benzene-cyclohexane (2:1) and from 95% ethanol to obtain 0.65 g. of [3 - chloro-4-(2-acetylvinyl)phenyl] acetic acid, M.P. 161°–164° C.

Elemental analysis for $C_{12}H_{11}ClO_3$.—Calc. (percent): C, 60.39; H, 4.65; Cl, 14.86. Found (percent): C, 60.58; H, 4.45; Cl, 14.93.

EXAMPLE 4

[3-(2,2-diacetylvinyl)phenyl]acetic acid

Step A: (3-formylphenyl)acetic acid.—A mixture of (3-cyanophenyl)acetic acid (10.5 g., 0.065 mole), Raney alloy (11.0 g.) and 65% aqueous formic acid (200 ml.) are heated at reflux for 45 minutes with stirring. After cooling, an additional 10 g. of Raney alloy is added and the reaction mixture is again heated at reflux for one hour. The reaction mixture is filtered and the insoluble residue is triturated with warm ethanol and filtered again. The filtrates are concentrated to near dryness under vacuum and the residue taken up in water; the aqueous mixtures are combined and extracted with several portions of chloroform. After drying over sodium sulfate, the chloroform solution is concentrated to dryness under vacuum to afford (3-formylphenyl)acetic acid, a pale yellow solid.

The product is recrystallized from benzene to afford 6.5 g. (61% yield) of (3-formylphenyl)acetic acid, M.P. 97°–99° C.

Elemental analysis for $C_9H_8O_3$.—Calc. (percent): C, 65.85; H, 4.91. Found (percent): C, 65.43; H, 4.78.

Step B: [3-(2,2-diacetylvinyl)phenyl]acetic acid.— A mixture of (3-formylphenyl)acetic acid (1.64 g., 0.01 mole), 2,4-pentanedione (1.5 g., 0.015 mole), acetic acid (3 ml.), benzene (35 ml.) and piperidine (5 drops) is heated at reflux under a constant water separator for one hour; a small quantity (0.15 ml.) of water is removed from this reaction mixture. The yellow solution is concentrated to dryness in vacuo and the oily residue taken up in aqueous sodium bicarbonate. Acidification with 6 N hydrochloric acid gives a yellow oil, which is extracted with ether. After drying over sodium sulfate, the ether solution is concentrated to dryness under vacuum to afford a yellow oil, which on scratching and cooling eventually solidifies. The crude product is recrystallized from benzene-cyclohexane to afford 1.2 g. of [3-(2,2-diacetylvinyl) phenyl]acetic acid (49% yield), M.P. 81°–83° C.

Elemental analysis for $C_{14}H_{14}O_4$.—Calc. (percent): C, 68.28; H, 5.73. Found (percent): C, 67.67; H, 5.25.

EXAMPLE 5

[3-(2-acetylvinyy)phenyl]acetic acid

A mixture of (3-formylphenyl)acetic acid (0.82 g., 0.005 mole), acetone (10 ml.) and 5% aqueous sodium hydroxide (8 ml.) is stirred at room temperature for 30 minutes. The yellow solution is diluted with water (25 ml.) and acidified with concentrated hydrochloric acid and the mixture is cooled. The crude solid is collected and is recrystallized from benzenecyclohexane to afford 0.55 g. (54% yield) of [3-(2-acetylvinyl)phenyl]acetic acid, M.P. 127°–129° C.

Elemental analysis for $C_{12}H_{12}O_3$.—Calc. (percent): C, 70.57; H, 5.92. Found (percent): C, 70.83; H, 5.69.

EXAMPLE 6

[4-(2,2-diacetylvinyl)-2-methylphenyl]acetic acid

Step A: (4-acetamido-2-methylphenyl)acetothiomorpholide.—4-acetyl-3-methylacetanilide (64.5 g., 0.337 mole) and flowers of sulfur (11.9 g., 0.372 mole) is mixed in a 300 ml. flask. Morpholine (32.4 g., 0.372 mole) is added and the flask is placed in an oil-bath at 100° C. An air condenser is added and the bath temperature brought to 130° C. and held at 125°–130° C. for 7 hours. The dark brown liquid is then poured with vigorous stirring into warm water (1 l.). The product oils out at first but then solidifies into a tan powder after a few minutes. The crude product is crystallized from ethanol to afford 51.0 g. of (4-acetamido-2-methylphenyl)acetothiomorphilide, M.P. 174°–176° C.

Elemental analysis for $C_{15}H_{20}N_2O_2S$.—Calc. (percent): C, 61.61; H, 6.98; N, 9.58. Found (percent): C, 61.31; H, 6.83; N, 9.49.

Step B: (4-amino-2-methylphenyl)acetic acid.—A 2 l. round-bottomed flask is charged with (4-acetamido-2-methylphenyl)acetothiomorphilide (87.5 g., 0.3 mole), concentrated hydrochloric acid (250 ml.) and water (500 ml.). The mixture is stirred magnetically on a steam bath. The reaction mixture becomes clear after about ½ hour and the heating and stirring are continued for 3 hours. The clear solution is evaporated under reduced pressure and the residual solid is dissolved in hot water (500 ml.) and is filtered. The clear yellow filtrate is made weakly alkaline (pH of 8) with a 20% sodium hydroxide solution (140 ml.) and then is acidified with glacial acetic acid (25 ml.) to a pH of 5 and set aside to crystallize. Filtration yields 39.6 g. of (4-amino-2-methylphenyl) acetic acid, M.P. 187°–190° C. as a beige powder. Several recrystallizations from ethanol-water afford substantially pure product, M.P. 192°–194° C.

Elemental analysis for $C_9H_{11}NO_2$.—Calc. (percent): C, 65.45; H, 6.71; N, 8.48. Found (percent): C, 66.07; H, 6.76; N, 8.54.

Step C: (4-cyano-2-methylphenyl)acetic acid.—A solution of sodium nitrite (20.8 g., 0.30 mole) in water (80 ml.) is added dropwise to a well stirred suspension of (4-amino-2-methylphenyl)acetic acid (33.0 g., 0.20 mole) in water (200 ml.) and concentrated hydrochloric acid (80 ml.) at 0° C. After the addition, the clear diazonium solution is stirred at 0° C. for one hour and then the excess nitrous acid is destroyed by the dropwise addition of urea (10 g. in water (25 ml.). The clear tan solution (turned dark red on standing) is added portionwise to a well stirred solution of cuprous cyanide (20.0 g., 0.204 mole), potassium cyanide (46.0 g., 0.723 mole), and sodium acetate trihydrate (334 g., 2.46 mole) in water (500 ml.) at 0° C. The deep purple solution is stirred at room temperature for one hour, at 50° C. for one hour, and then overnight at room temperature. The reaction mixture is filtered and the filtrate is acidified with concentrated hydrochloric acid (250 ml.). After cooling to about 5° C. the (4-cyano-2-methylphenyl) acetic acid is obtained as a tan powder, 30.75 g., M.P. 160°–170° C. Recrystallization from an ethanol-water mixture yields 16.4 g. of (4-cyano-2-methylphenyl)acetic acid, M.P. 175°–176.5° C. Another recrystallization from ethanol-water mixture affords the analytical sample with a M.P. of 176.5°–177° C.

Elemental analysis for $C_{10}H_9NO_2$.—Calc. (percent): C, 68.56; H, 5.18; N, 8.00. Found (percent): C, 68.68; H, 5.20; N, 8.06.

Step D: (4-formyl-2-methylphenyl)acetic acid.—Raney nickel alloy (30 g.), (4-cyano-2-methylphenyl) acetic acid (29.2 g., 0.165 mole), and 75% aqueous formic acid (450 ml.) are refluxed with vigorous stirring for one hour. The mixture is cooled, filtered by suction, and the residue is washed with warm ethanol (3× 100 ml.). The filtrate and washings are combined and evaporated under reduced pressure to about 300 ml. The concentrate is cooled, diluted with water (1 l.) and is extracted with several portions of chloroform (4× 200 ml.). The chloroform extracts are combined, dried over magnesium sulfate and evaporated under reduced pressure. The crude product is crystallized from water to afford 16.3 g. of (4-formyl-2-methylphenyl)acetic acid, M.P. 117°–118.5° C.

Elemental analysis for $C_{10}H_{10}O_3$.—Calc. (percent) C, 67.40; H, 5.66. Found (percent): C, 67.47; H, 5.80.

Step E: [4-(2,2-diacetylvinyl)-2-methylphenyl]acetic acid.—A 500 ml. round-bottomed flask fitted with a Dean-Stark trap was charged with 2,4-pentanedione (12 g., 0.12 mole), [4-formyl-2-methylphenyl]acetic acid (7.1 g., 0.04 mole), piperidine acetate (400 mg.), and benzene (200 ml.). The solution is refluxed for 4 hours. The benzene is evaporated under reduced pressure and the residue is crystallized from benzenehexane to yield 4.1 g. of [4-(2,2-diacetylvinyl)-2-methylphenyl]acetic acid, M.P. 114.5°–115° C.

Elemental analysis for $C_{15}H_{16}O_4$.—Calc. (percent): C, 69.21; H, 6.20. Found (percent): C, 69.11; H, 6.29.

EXAMPLE 7

[4-(2,2-diacetylvinyl)-1-naphthyl]acetic acid

Step A: Ethyl (4-bromo-1-naphthyl)acetate.—(4-bromo-1-naphthyl)acetic acid (101 g., 0.382 mole) is dissolved by warming and stirring in thionyl chloride (1.0 l.) and the resulting yellow solution is refluxed for two hours. The excess thionyl chloride is removed under reduced pressure. The residual brown liquid is washed twice with anhydrous benzene (2× 200 ml.) and evaporated to dryness each time to remove the last traces of thionyl chloride. To the residual brown oil is added absolute ethanol (1.0 l.) containing pyridine (31.7 g., 0.40 mole). After the initial exothermic reaction, the solution is heated under reflux for 45 minutes and the ethanol is evaporated at reduced pressure. The light brown solid is dissolved in ether (500 ml.), washed successively with water, two portions of saturated sodium bicarbonate [to remove any (4-formyl-1-naphthyl)acetic acid formed] and water. The ether solution is dried over magnesium sulfate, filtered and the ether is evaporated. The residual oil solidifies into a tan crystalline mass of needles, 108 g., M.P. 43°–45.5° C. The crude product is distilled under vacuum to yield ethyl (4-bromo-1-naphthyl)acetate as a light yellow liquid, 103.5 g., B.P. 130°–135° C./0.05–0.07 mm. which crystallizes immediately upon cooling, M.P. 44°–46° C.

Elemental analysis for $C_{14}H_{13}BrO_2$.—Calc. (percent): C, 57.36; H, 4.47. Found (percent): C, 57.13; H, 4.38.

Step B: Ethyl (4-cyano-1-naphthyl)acetate.—In a 1 l. flask fitted with a condenser and a stirrer is placed ethyl (4-bromo-1-naphthyl)acetate (103 g., 0.352 mole), cuprous cyanide (35 g., 0.375 mole), dimethylformamide (600 ml.), and pyridine (5 ml.). The mixture is heated under reflux with vigorous stirring for 6 hours. This hot solution is poured, with stirring, into an ammonium hydroxide solution (2 l., 15 N) containing crushed ice (1.5 kg.). The resulting blue liquid and red-brown solid is extracted with chloroform (8× 500 ml.), the extract is washed with dilute hydrochloric acid, water, and dried over magnesium sulfate. The chloroform is evaporated under reduced pressure and the dark residual oil is distilled under vacuum to afford ethyl (4-cyano-1-naphthyl) acetate as a reddish-orange oil, 75.4 g., B.P. 165°–173° C./0.03–0.05 mm. which solidifies upon standing, M.P. 55°–59° C. This solid is recrystallized from cyclohexane-chloroform to afford 61 g. of ethyl (4-cyano-1-naphthyl)acetate, M.P. 61.5°–63.0° C. An analytical sample is prepared by recrystallization from cyclohexane-petroleum ether to obtain a pure sample, M.P. 63.5°–64.5° C.

Elemental analysis for $C_{15}H_{13}NO_2$.—Calc. (percent): C, 75.30; H, 5.48; N, 5.85. Found (percent): C, 75.51; H, 5.42; N, 5.80.

Step C.: Ethyl (4-formyl-1-naphthyl)acetate.—Raney nickel alloy (61 g.), ethyl (4-cyano-1-naphthyl)acetate (61 g., 0.255 mole), and 75% aqueous formic acid (1. l.) are refluxed with vigorous stirring for 1½ hours in a 5 l. flask. The reaction mixture is then cooled slightly and an additional charge of alloy (122 g.) is added with water (350 ml.). The heating and stirring are continued for an additional 2 hours. Much foaming occurs but because of the size of the flask offers no problem. The reaction mixture then is cooled, filtered, and the flask and residue are washed with several portions of warm ethanol (2× 400 ml.). The washings and the original filtrate are combined and evaporated under reduced pressure to about 1 l. The greenish brown solution is poured into 4 l. water and extracted with chloroform (8× 250 ml.). The beige extracts are combined and washed with a saturated sodium bicarbonate solution (2× 500 ml.) and then dried over magnesium sulfate. The chloroform is evaporated under reduced pressure to yield the crude ethyl (4-formyl-1-naphthyl)acetate, 34.7 g., as a brown oil. Distillation affords substantially pure ethyl (4-formyl-1-naphthyl)acetate as a faint yellow oil, 27.7 g., B.P. 157°–164° C./0.09–0.10 mm.

Elemental analysis for $C_{15}H_{14}O_3$.—Calc. (percent): C, 74,36; H, 5.83. Found (percent): C, 73.52; H, 5.81.

Step D: [4-(2,2-diacetylvinyl)-1-naphthyl]acetic acid.—A 500 ml. flask is fitted with a Dean-Stark trap and is charged with 2,4-pentanedione (9.0 g., 0.09 mole), ethyl (4-formyl-1-naphthyl)acetate (7.26 g., 0.03 mole), piperidine acetate (300 mg.), and benzene (100 ml.). The solution is refluxed for 3 hours and then the benzene is evaporated under reduced pressure. The residual yellow oil is dissolved in a hot mixture of acetic acid (75 ml.), water (60 ml.), and concentrated hydrochloric acid (6 ml.). The yellow solution is then refluxed for 45 minutes and the resulting clear brown solution is cooled, and poured with vigorous stirring into cold water (750 ml.). The product separates as a semi-solid which is crystallized from ethyl acetate to yield substantially pure [4-(2,2-diacetylvinyl)-1-naphthyl]acetic acid as thick light yellow needles, 0.70 g., M.P. 145°–146° C.

No. 75445 Rampmeyer, C. M. 3–28–73 Day Mach. 58

Elemental analysis for $C_{18}H_{16}O_4$.—Calc. (percent): C, 72.96; H, 5.44. Found (percent): C, 72.56; H, 5.47.

EXAMPLE 8

[4-(2,2-diacetylvinyl)-1-naphthyl]acetic acid

Step A: (4-formyl-1-naphthyl)acetic acid.—The sodium bicarbonate extracts from Example 7, Step A, are combined and acidified with dilute hydrochloric acid to afford 10.7 g. of crude 4-formyl-1-naphthylacetic acid as a light beige powder, M.P. 180°–184° C. Several recrystallization from an ethanol-water mixture yield substantially pure (4-formyl-1-naphthyl)acetic acid, M.P. 192.5°–193.5° C.

Elemental analysis for $C_{13}H_{10}O_3$.—Calc. (percent): C, 72.89; H, 4.71. Found (percent): C, 73.08; H, 4.66.

Step B: [4-(2,2-diacetylvinyl)-1-naphthyl]acetic acid.—A 300 ml. flask fitted with a Dean-Stark trap is charged with 2,4-pentanedione (4.5 g., 0.045 mole, (4-formyl-1-naphthyl)acetic acid (5.86 g., 0.0274 mole), piperidine (15 drops), acetic acid (10 ml.), and toluene (90 ml.). The mixture is refluxed for 2 hours and then set aside to crystallize. After standing in a freezer for about 48 hours the crude product is obtained as a mixture of light yellow powder and a brown crystalline mass, 4.66 g., M.P. 138°–142° C. Recrystallization from ethyl acetate yields 2.55 g. of substantially pure product as light yellow-brown needles, M.P. 145°–146° C.

EXAMPLE 9

4-(2,2-diacetylvinyl)cinnamic acid

To a solution of 4-formylcinnamic acid (3.5 g., 0.02 mole) in benzene (70 ml.) is added, 2,4-pentanedione (3.6 g., 0.036 mole), acetic acid (7 ml.) and piperidine (10 drops). The mixture is refluxed under a constant water separator until no more water is evolved. The mixture is concentrated to dryness to afford 4-(2,2-diacetylvinyl)cinnamic acid.

EXAMPLE 10

[4-(2,2-diacetylvinyl)phenyl]propionic acid

To a solution of (4-formylphenyl)propionic acid (0.02 mole) in benzene (70 ml.) is added 2,4-pentanedione (3.6 g., 0.036 mole), acetic acid (7 ml.) and piperidine (10 drops). The mixture is refluxed under a constant water separator until no more water is evolved. The mixture is concentrated to dryness to afford [4-(2,2-diacetylvinyl)phenyl]propionic acid.

EXAMPLE 11

[3-[2,3-dichloro-4-(2,2-diacetylvinyl) phenyl]]propionic acid

Step A: α,α'-2,3-tetrachloro-p-xylene.—To 2,3-dichloro-p-xylene (175 g., 1 mole) is added, gradually, phosphorous pentachloride (408 g., 2 mole) with stirring. With continued stirring, the mixture is heated to 190°–200° C. until hydrogen chloride gas ceases to be evolved. The mixture then is allowed to cool. The mixture is added carefully to water and the organic material is taken up in chloroform. The chloroform extract is washed with water, 10% sodium bicarbonate and with water, dried over sodium sulfate and the chloroform is evaporated to afford α,α'-2,3-tetrachloro-p-xylene which is used directly in the next step.

Step B: 2,3-dichloroterephthalic aldehyde.—Hexamine (62 g., 0.44 mole) is dissolved in warm chloroform (500 ml.) with stirring. Then α,α'-2,3-tetrachloro-p-xylene (48.8 g., 0.2 mole) in a minimum amount of warm chloroform is added. The mixture is refluxed for 4 hours and then allowed to cool. The hexaminium salt that separates is collected and washed with chloroform. The hexaminium salt (52.4 g., 0.1 mole) is added to 50% acetic acid (180 ml.) and the mixture is refluxed for about 2 hours. The mixture is acidified to Congo red and refluxed for an additional 5 minutes. The mixture is cooled and diluted with water until the separation of the 2,3-dichloroterephthalic aldehyde is complete. The 2,3-dichloroterephthalic aldehyde is collected and purified by crystallization from a suitable solvent such as alcohol or alcohol-water.

Step C: 2,3-dichloro-4-formylcinnamic acid.—A mixture of 20.3 g. (0.1 mole) of 2,3-dichloroterephthalic aldehyde, acetic anhydride (10.2 g., 0.1 mole) and anhydrous sodium acetate (10 g.) are combined and heated at 180° C. under a short air condenser for 8 hours. The cooled mixture is diluted with water and extracted with ether. The ether solution is extracted thoroughly with dilute sodium bicarbonate solution. The aqueous extract is washed with ether and acidified with dilute hydrochloric acid. The 2,3-dichloro-4-formylcinnamic acid that separates is collected, dried and recrystallized from benzene or alcohol.

Step D: 3 - (2,3 - dichloro - 4 - formylphenyl)propionic acid.—2,3-dichloro-4-formylcinnamic acid (10 g.) is dissolved in ethanol and 250 mg. of rhodium on carbon catalyst (5%) is added. The mixture is hydrogenated at 30 p.s.i. original pressure. The hydrogenation is interrupted when exactly 1 mole of hydrogen has been absorbed. The catalyst is removed and the alcohol is evaporated. The residue is crystallized from benzene to obtain 3-(2,3-dichloro-4-formylphenyl)propionic acid.

Step E: [3-[2,3-dichloro-4-(2,2-diacetylvinyl)phenyl]]-propionic acid.—By substituting for the (3-chloro-4-formylphenyl)acetic acid of Example 2, Step E, an equimolar quantity of 3-(2,3-dichloro-4-formylphenyl)propionic acid and by following substantially the procedure described therein, there is obtained [3-[2,3-dichloro-4-(2,2-diacetylvinyl)phenyl]]propionic acid.

EXAMPLE 12

3-[2,3-dichloro-4-(2,2-diacetylvinyl)phenyl]-2-methylcinnamic acid

Step A: 3-(2,3-dichloro-4-formylphenyl)-2-methylcinnamic acid.—By substituting for the acetic anhydride and sodium acetate of Example 11, Step C, an equimolar quantity of propionic anhydride and sodium propionate and by following substantially the procedure described therein, there is obtained 3-(2,3-dichloro-4-formylphenyl)-2-methylcinnamic acid.

Step B: 3-[2,3-dichloro-4-(2,2-diacetylvinyl)phenyl]-2-methylcinnamic acid.—By substituting for the (3-chloro-4-formylphenyl)acetic acid of Example 2, Step E, an equimolar quantity of 3-(2,3-dichloro-4-formylphenyl)-2-methylcinnamic acid and by following substantially the procedure described therein, there is obtained 3-[2,3-dichloro - 4 - (2,2-diacetylvinyl)phenyl]-2-methylcinnamic acid.

EXAMPLE 13

[2,3-dichloro-4-(2,2-diacetylvinyl)]cinnamic acid

By substituting for the (3-chloro-4-formylphenyl)acetic acid of Example 2, Step E, an equimolar quantity of 2,3-dichloro-4-formylcinnamic acid and by following substantially the procedure described therein, there is obtained [2,3-dichloro-4-(2,2-diacetylvinyl)]cinnamic acid.

By following the procedure as described in Example 2, Steps A–E, all of the products described in the following table may be prepared. Thus, by substituting the appropriately substituted acetamidoacetophenone for the 3-chloro-4-acetamidoacetophenone of Example 2, Step A, and by following the procedure of Example 2, Steps A–D, there is produced the corresponding substituted formylphenylacetic acid. Then by substituting said formylphenylacetic acid and an appropriately substituted ketone or diketone for the (3-chloro-4-formylphenyl)acetic acid and 2,4-pentanedione of Example 2, Step E, and by following substantially the procedure described therein, all the products described in Table I may be prepared. The following equation illustrates the reactions of Example 2. Steps A–E and, together with Table I, illustrate the starting materials, intermediates and [(mono and diacylvinyl)phenyl]acetic acid products obtained:

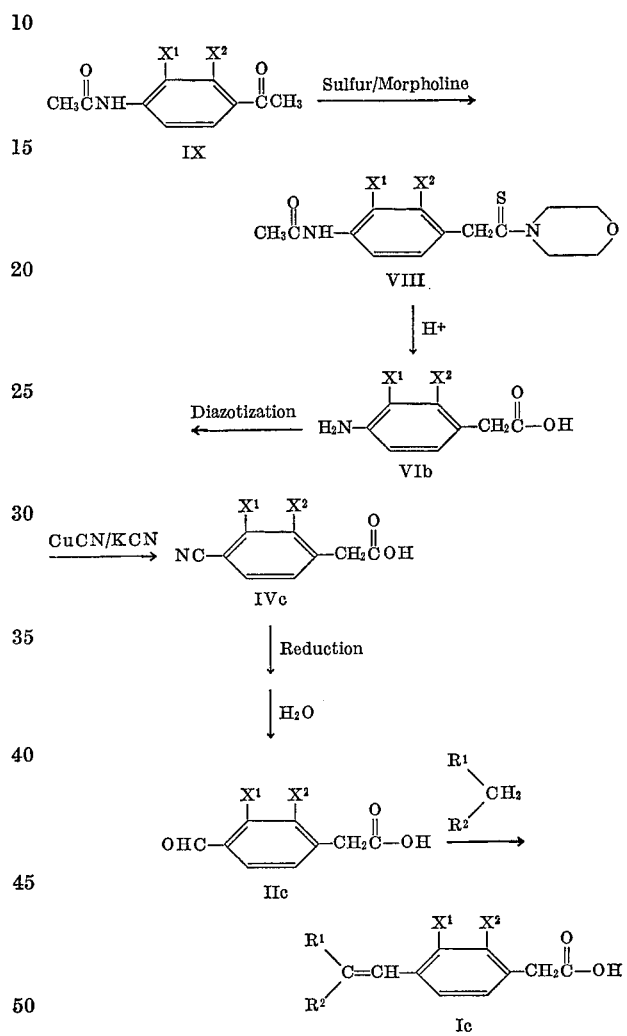

TABLE I

| Example number | R¹ | R² | X¹ | X² |
|---|---|---|---|---|
| 14 | —CH₃ | —C(O)CH₃ | Cl | H |
| 15 | —C₂H₅ | Same as above | Cl | Cl |
| 16 | H | —C(O)—CH—CH₂—CH₂ (cyclic) | —CH₃ | H |
| 17 | H | —C(O)CH₃ | —CH₃ | —CH₃ |
| 18 | H | —C(O)CH₂NO₂ | Cl | H |
| 19 | H | —C(O)—CH(CH₂CH₂) (cyclopropyl) | H | H |
| 20 | H | —C(O)—n-C₃H₇ | Cl | Cl |

TABLE I—Continued

| Example number | R¹ | R² | X¹ | X² |
|---|---|---|---|---|
| 21 | H | −C(=O)−i-C₃H₇ | Br | H |
| 22 | H | −C(=O)(OH)C(CH₃)(CH₃) | F | H |
| 23 | H | −C(=O)CH=C(CH₃)(CH₃) | Cl | H |
| 24 | H | −C(=O)−n-C₅H₁₁ | −CH₃ | −CH₃ |
| 25 | H | −C(=O)−(thienyl S) | H | H |
| 26 | H | −C(=O)−n-C₆H₁₃ | Cl | Cl |
| 27 | −n-C₃H₇ | −C(=O)CH₃ | Cl | Cl |
| 28 | H | −C(=O)CH₂−phenyl | H | H |
| 29 | —(joined)— −C(=O)−CH₂−CH₂−CH₂− | | H | H |
| 30 | —(joined)— −C(=O)−CH₂−CH₂−CH₂−CH₂− | | H | H |
| 31 | —(joined)— −C(=O)−CH₂CH₂CH₂CH₂CH₂− | | H | H |
| 32 | −C(=O)CH₃ | −C(=O)C₂H₅ | Cl | Cl |
| 33 | −C(=O)C₂H₅ | −C(=O)C₂H₅ | Cl | H |
| 34 | −C(=O)C₂H₅ | −C(=O)−n-C₃H₇ | Cl | H |
| 35 | −C(=O)−n-C₃H₇ | −C(=O)−n-C₃H₇ | Cl | H |

The novel compounds of this invention are diuretic and saluretic agents which can be administered in a wide variety of therapeutic dosages in conventional vehicles as, for example, by oral administration in the form of a tablet or by intravenous injection. Also, the daily dosage of the products may be varied over a wide range varying from 5 to 500 mg. The product is preferably administered in subdivided doses in the form of scored tablets containing 5, 10, 25, 50, 100, 150, 250 and 500 milligrams of the active ingredient for the symptomatic adjustment of the dosage to the patient to be treated. These dosages are well below the toxic or lethal dose of the products.

A suitable unit dosage form of the products of this invention can be administered by mixing 50 milligrams of a [(mono- or diacylvinyl)aryl]alkanoic (or alkenoic) acid (I) or a suitable salt, ester or amide derivative thereof, with 149 mg. of lactose and 1 mg. of magnesium stearate and placing the 200 mg. mixture into a No. 1 gelatin capsule. Similarly, by employing more of the active ingredient and less lactose, other dosage forms can be put up in No. 1 gelatin capsules and, should it be necessary to mix more than 200 mg. of ingredients together, larger capsules may be employed. Compressed tablets, pills, or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds of this invention with other known diuretics and saluretics or with other desired therapeutic and/or nutritive agents in dosage unit form.

The following example is included to illustrate the preparation of a representative dosage form:

EXAMPLE 36

Dry-filled capsules containing 50 mg. of active ingredient per capsule

|  | Mg. per capsule |
|---|---|
| [3-chloro-4-(2,2-diacetylvinyl)phenyl]acetic acid | 50 |
| Lactose | 149 |
| Magnesium stearate | 1 |
| Capsule (size No. 1) | 200 |

The [3-chloro-4-(2,2-diacetylvinyl)phenyl]acetic acid is reduced to a No. 60 powder and then lactose and magnesium stearate are passed through a No. 60 bolting cloth onto the powder and the combined ingredients admixed for 10 minutes and then filled into a No. 1 dry gelatin capsule.

Similar dry-filled capsules can be prepared by replacing the active ingredient of the above example by any of the other novel compounds of this invention.

It will be apparent from the foregoing description that the [(mono- and diacylvinyl)aryl]alkanoic (and alkenoic) acid products (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound of the formula:

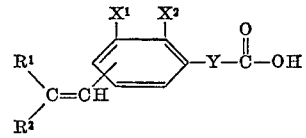

wherein R¹ is hydrogen, lower alkyl or lower alkanoyl; R² is lower alkanoyl, nitro substituted lower alkanoyl, hydroxy substituted lower alkanoyl, cycloalkylcarbonyl containing from 3–6 nuclear carbon atoms, lower alkenoyl, phenylacetyl or R¹ and R² may be joined with the carbon to which they are attached, to form a 2-oxocycloalkylidene radical containing from 5–7 nuclear carbon atoms; X¹ and X² are hydrogen, halo or lower alkyl or, taken together, X¹ and X² may be joined to form a 1,3-butadienylene chain and Y is lower alkylene or lower alkenylene; and the non-toxic, pharmaceutically acceptable salts and lower alkyl esters thereof.

2. A compound of the formula:

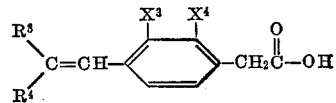

wherein $R^3$ is hydrogen or lower alkanoyl; $R^4$ is lower alkanoyl; $X^3$ and $X^4$ are hydrogen or halo with the proviso that one of the $X^3$ or $X^4$ radicals is halo or $X^3$ and $X^4$, taken together, may be joined to form a 1,3-butadienylene linkage; and the non-toxic, pharmaceutically acceptable salts thereof.

3. A compound according to claim 2 wherein $R^3$ and $R^4$ are acetyl; $X^3$ is chloro and $X^4$ is hydrogen.

4. A compound according to claim 2 wherein $R^3$ is hydrogen; $R^4$ is acetyl; $X^3$ is chloro and $X^4$ is hydrogen.

5. A compound according to claim 2 wherein $R^3$ and $R^4$ are acetyl and $X^3$ and $X^4$ are joined to form a 1,3-butadienylene linkage.

References Cited

UNITED STATES PATENTS 3,465,022  9/1969  Cragoe et al. _____ 260—518 R

JAMES A. PATTEN, Primary Examiner

U.S. Cl. X.R.

260—141, 247.1, 247.2 R, 248.5, 290 R, 293.51, 326.3, 465 D, 469, 471 A, 473 R, 473 F, 476 R, 515 A, 520, 521 R, 521 A, 558 R, 559 R, 599; 424—308, 317, 324